(12) United States Patent
Misaizu et al.

(10) Patent No.: US 11,080,921 B2
(45) Date of Patent: Aug. 3, 2021

(54) THREE-DIMENSIONAL OBJECT DATA GENERATION APPARATUS, THREE-DIMENSIONAL OBJECT FORMING APPARATUS, AND NON-TRANSITORY COMPUTER READABLE MEDIUM

(71) Applicant: FUJIFILM Business Innovation Corp., Tokyo (JP)

(72) Inventors: Toru Misaizu, Kanagawa (JP); Naoki Hiji, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/550,280

(22) Filed: Aug. 25, 2019

(65) Prior Publication Data

US 2020/0074719 A1    Mar. 5, 2020

(30) Foreign Application Priority Data

Aug. 29, 2018  (JP) .............................. JP2018-160530
Jan. 16, 2019  (JP) .............................. JP2019-005289

(51) Int. Cl.
   *G06T 15/08*   (2011.01)
   *G06T 7/13*    (2017.01)

(52) U.S. Cl.
   CPC ................ *G06T 15/08* (2013.01); *G06T 7/13* (2017.01); *G06T 2200/04* (2013.01)

(58) Field of Classification Search
   CPC ........ G06T 7/13; G06T 15/08; G06T 2200/04
   See application file for complete search history.

(56) References Cited

U.S. PATENT DOCUMENTS 10,336,051 B2    7/2019  Utsunomiya
2018/0099496 A1* 4/2018  Morovic ................. G06T 15/10

FOREIGN PATENT DOCUMENTS

| JP | 2017030177 | 2/2017 |
| JP | 2017109427 | 6/2017 |
| JP | 2018001725 | 1/2018 |

* cited by examiner

*Primary Examiner* — Jennifer Mehmood
*Assistant Examiner* — Jed-Justin Imperial
(74) *Attorney, Agent, or Firm* — JCIPRNET (57) ABSTRACT

A three-dimensional object data generation apparatus includes an obtaining unit that obtains three-dimensional object data representing a three-dimensional object with plural voxels, for each of which a physical property value is set, a setting unit that sets a three-dimensional threshold matrix in which thresholds are arranged in a three-dimensional space in accordance with a predetermined basic shape, and a calculation unit that calculates whether to form each of the plural voxels on a basis of the physical property value of the voxel and the three-dimensional threshold matrix.

11 Claims, 11 Drawing Sheets

THREE-DIMENSIONAL OBJECT DATA GENERATION APPARATUS, THREE-DIMENSIONAL OBJECT FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-160530 filed Aug. 29, 2018 and Japanese Patent Application No. 2019-005289 filed Jan. 16, 2019.

BACKGROUND

(i) Technical Field

The present disclosure relates to a three-dimensional object data generation apparatus, a three-dimensional object forming apparatus, and a non-transitory computer readable medium.

(ii) Related Art

Japanese Unexamined Patent Application Publication No. 2017-109427 discloses a solid body forming apparatus including a dot forming unit that forms dots included in a solid body to be formed and a support member that supports the solid body and a control unit that controls the forming of the solid body and the support member including the dots. The control unit arranges the dots in a voxel group that represents the support member on the basis of an input value indicating a forming ratio of the dots in voxels included in the voxel group and a dither mask such that a support structure that supports the solid body is formed.

Japanese Unexamined Patent Application Publication No. 2017-30177 discloses a solid body forming apparatus that includes a head unit capable of discharging liquid, a curing unit that forms dots by curing the liquid discharged from the head unit, and a forming control unit that controls operation of the head unit such that a solid body is formed as a group of dots by representing a shape of the solid body to be formed with a voxel group and forming the dots in voxels, in the voxel group, determined by a determination unit as voxels in which the dots are to be formed. The determination unit determines the voxels in which the dots are to be formed in accordance with a forming index, which is a value according to a forming ratio of the dots in voxels in the voxel group inside the solid body and a result of comparison with a threshold included in the dither mask.

Japanese Unexamined Patent Application Publication No. 2018-1725 discloses a three-dimensional data generation apparatus including a measurement result reception unit that receives results of measurement of a shape of a first object output from an output apparatus using first three-dimensional data specifying the shape of the first object, a correction data calculation unit that calculates correction data on the basis of an error from the shape specified by the first three-dimensional data corresponding to the results of measurement received by the measurement result reception unit, and a data correction unit that corrects second three-dimensional data specifying a shape of a second object using the correction data calculated by the correction data calculation unit.

SUMMARY

When it is desired to achieve a desired physical property, such as a desired level of strength, for a three-dimensional object formed by a three-dimensional object forming apparatus, a forming material corresponding to the desired physical property has been conventionally used. If a physical property is to be changed in this case, a forming material used needs to be changed. It is therefore difficult to easily adjust physical properties or partially change physical properties.

In another case, a desired physical property is achieved by adjusting the density of the internal structure of a three-dimensional object.

When the density of the internal structure of a three-dimensional object is adjusted, however, it is difficult to accurately achieve a desired physical property for the three-dimensional object.

Aspects of non-limiting embodiments of the present disclosure relate to a three-dimensional object data generation apparatus, a three-dimensional object forming apparatus, and a non-transitory computer readable medium capable of finely adjusting physical properties for a three-dimensional object compared to when physical properties achieved by a three-dimensional object are controlled by adjusting the density of the internal structure of the three-dimensional object.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a three-dimensional object data generation apparatus includes an obtaining unit that obtains three-dimensional object data representing a three-dimensional object with a plurality of voxels, for each of which a physical property value is set, a setting unit that sets a three-dimensional threshold matrix in which thresholds are arranged in a three-dimensional space in accordance with a predetermined basic shape, and a calculation unit that calculates whether to form each of the plurality of voxels on a basis of the physical property value of the voxel and the three-dimensional threshold matrix.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described hereinafter with reference to the drawings.

Figure 1:
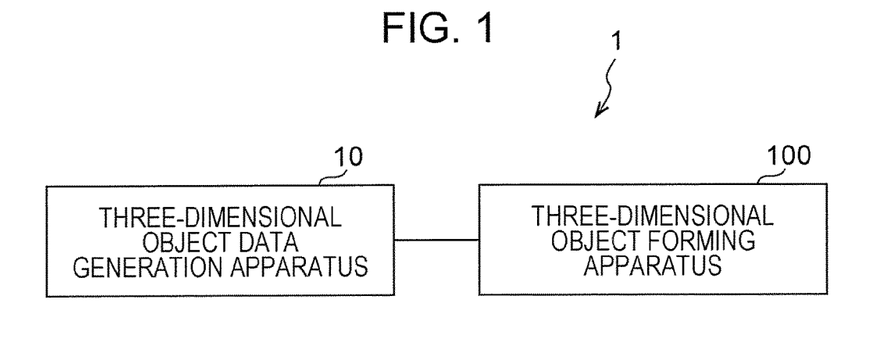
FIG. 1 is a diagram illustrating the configuration of a three-dimensional object forming system.

FIG. 1 is a diagram illustrating the configuration of a three-dimensional object forming system 1 according to the present exemplary embodiment. As illustrated in FIG. 1, the three-dimensional object forming system 1 includes a three-dimensional object data generation apparatus 10 and a three-dimensional object forming apparatus 100.

Figure 2:
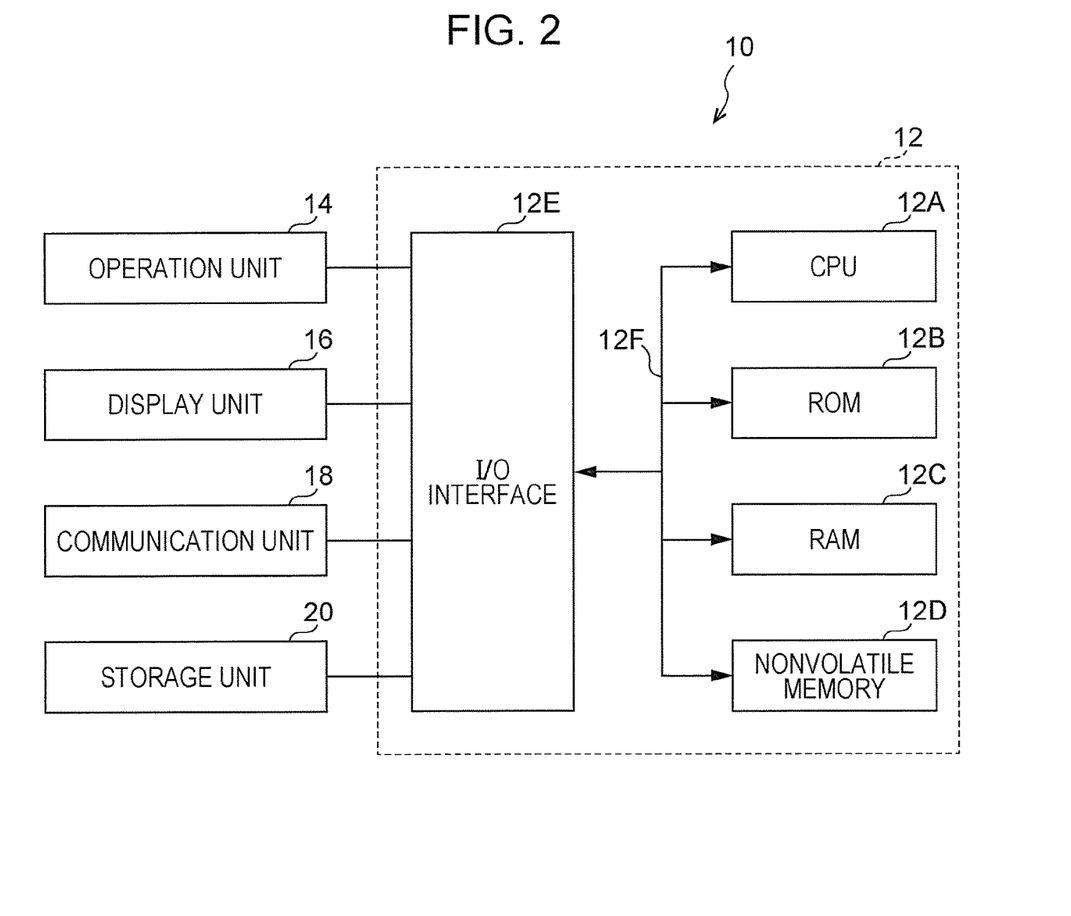
FIG. 2 is a diagram illustrating the configuration of a three-dimensional object data generation apparatus.

Next, the configuration of the three-dimensional object data generation apparatus 10 according to the present exemplary embodiment will be described with reference to FIG. 2.

The three-dimensional object data generation apparatus 10 is a personal computer, for example, and includes a controller 12. The controller 12 includes a central processing unit (CPU) 12A, a read-only memory (ROM) 12B, a random-access memory (RAM) 12C, a nonvolatile memory 12D, and an input/output (I/O) interface 12E. The CPU 12A, the ROM 12B, the RAM 12C, the nonvolatile memory 12D, and the I/O interface 12E are connected to one another through a bus 12F.

An operation unit 14, a display unit 16, a communication unit 18, and a storage unit 20 are connected to the I/O interface 12E. The CPU 12A is an example of an obtaining unit, a setting unit, a calculation unit, an edge extraction unit, and a conversion unit.

The operation unit 14 includes, for example, a mouse and a keyboard.

The display unit 16 is, for example, a liquid crystal display.

The communication unit 18 is an interface for communicating data with external apparatuses such as the three-dimensional object forming apparatus 100.

The storage unit 20 is a nonvolatile storage device such as a hard disk and stores a program for generating three-dimensional object data, which will be described later, three-dimensional object data (voxel data), a three-dimensional threshold matrix, which will be described later, a strength conversion LUT, and the like. The CPU 12A reads the program for generating three-dimensional object data stored in the storage unit 20 and executes the program.

Figure 3:
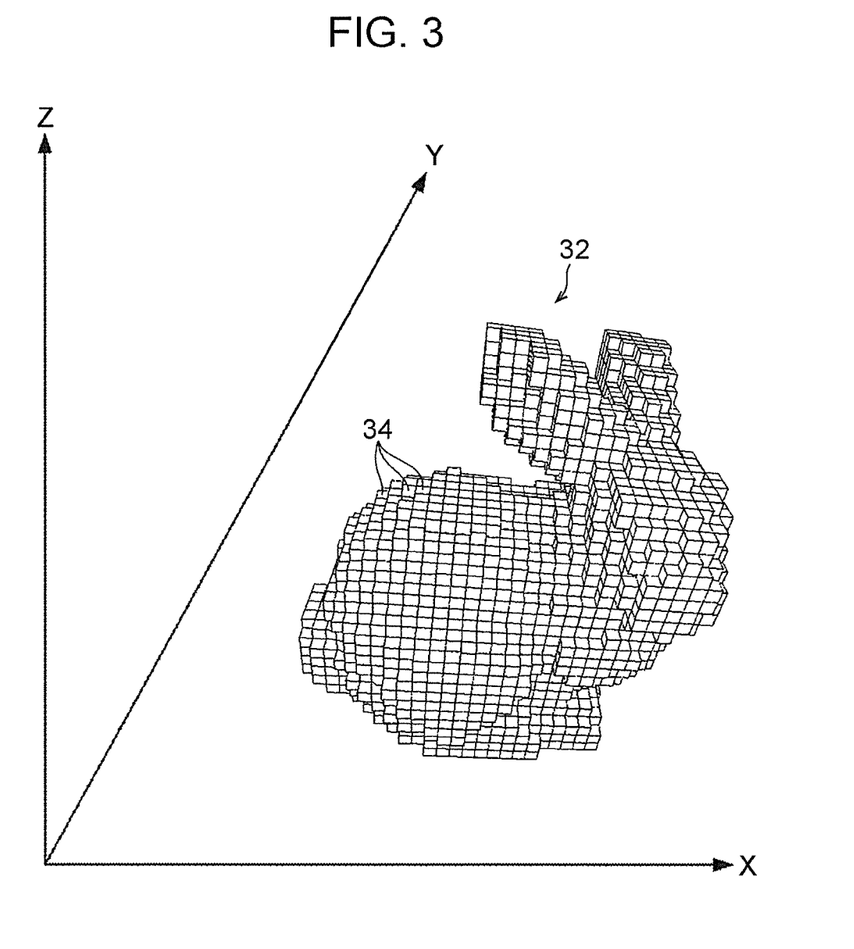
FIG. 3 is a diagram illustrating an example of a three-dimensional object represented by voxel data.

FIG. 3 illustrates a three-dimensional object 32 represented by three-dimensional object data (voxel data), which is a group of voxels. As illustrated in FIG. 3, the three-dimensional object 32 includes a plurality of voxels 34.

The voxels 34 are basic elements of the three-dimensional object 32. The voxels 34 may be rectangular parallelepipeds, for example, but may be spheres or cylinders, instead. A desired three-dimensional object is represented by stacking the voxels 34 on one another.

In the present exemplary embodiment, a strength value, which indicates the strength of each of the voxels as a physical property value, is set for the voxel.

As a method for forming a three-dimensional object, for example, fused deposition modeling (FDM), in which a thermoplastic resin is plasticized and stacked to form a three-dimensional object, or selective laser sintering (SLS), in which a laser beam is radiated onto a powdery metal material to form a three-dimensional object through sintering, is used, but another method may be used, instead. In the present exemplary embodiment, a case where a three-dimensional object is formed using FDM will be described.

Next, a three-dimensional object forming apparatus that forms a three-dimensional object using three-dimensional object data generated by the three-dimensional object data generation apparatus 10 will be described.

Figure 4:
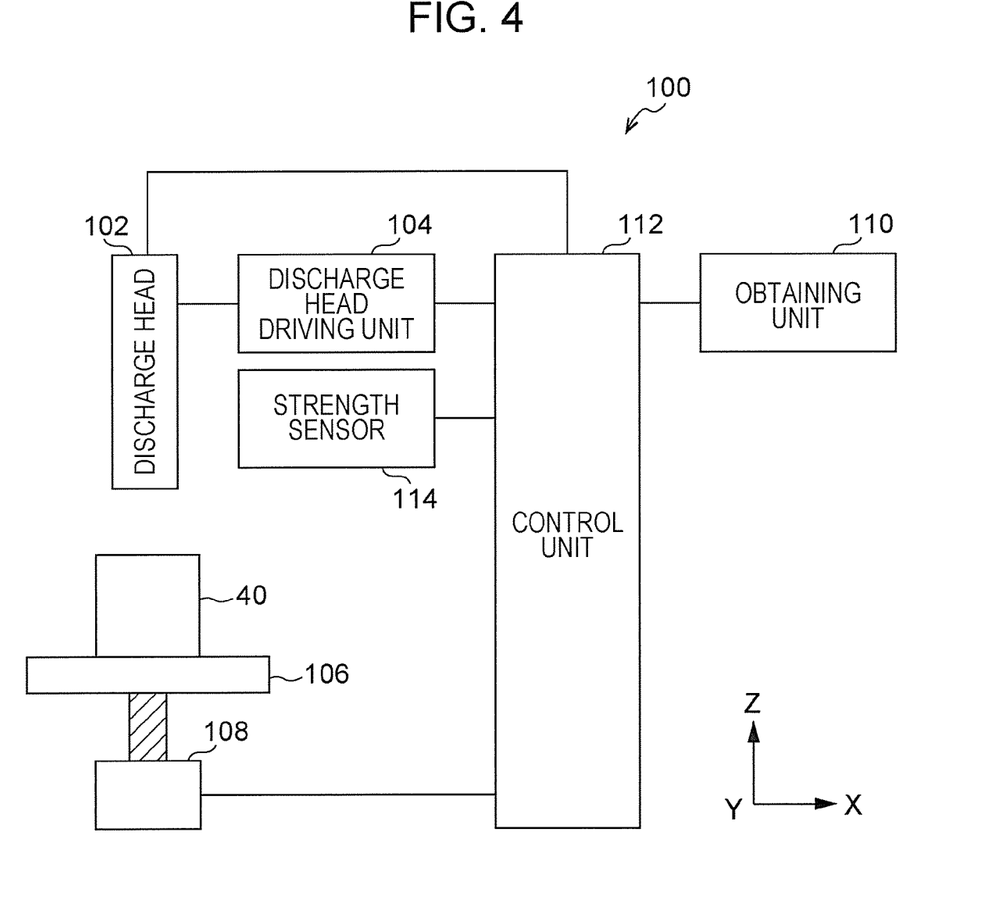
FIG. 4 is a diagram illustrating the configuration of a three-dimensional object forming apparatus.

FIG. 4 illustrates the configuration of the three-dimensional object forming apparatus 100 according to the present exemplary embodiment. The three-dimensional object forming apparatus 100 forms a three-dimensional object using FDM.

As illustrated in FIG. 4, the three-dimensional object forming apparatus 100 includes a discharge head 102, a discharge head driving unit 104, a stand 106, a stand driving unit 108, an obtaining unit 110, a control unit 112, and a strength sensor 114. The discharge head 102, the discharge head driving unit 104, the stand 106, and the stand driving unit 108 are an example of a forming unit.

The discharge head 102 includes a forming material discharge head that discharges a forming material for forming a three-dimensional object 40 and a support material discharge head that discharges a support material. The support material is used to support overhangs (also referred to as "projections") of the three-dimensional object 40 and removed after the three-dimensional object 40 is formed.

The discharge head 102 is driven by the discharge head driving unit 104 and moves on an X-Y plane in two dimensions. The forming material discharge head may include a plurality of discharge heads corresponding to forming materials of a plurality of attributes (e.g., colors).

The stand 106 is driven by the stand driving unit 108 and moves along a Z axis.

The obtaining unit 110 obtains three-dimensional object data and support material data generated by the three-dimensional object data generation apparatus 10.

The control unit 112 drives the discharge head driving unit 104 to move the discharge head 102 in two dimensions and controls the discharge of the forming material and the support material performed by the discharge head 102 such that the forming material is discharged in accordance with the three-dimensional object data obtained by the obtaining unit 110 and the support material is discharged in accordance with the support material data obtained by the obtaining unit 110.

Each time a layer has been formed, the control unit 112 drives the stand driving unit 108 to lower the stand 106 by a predetermined layer interval.

The strength sensor 114 measures the strength of a three-dimensional object. As the strength sensor 114, a sensor that measures strength by radiating light onto a three-dimensional object and measuring reflected light, for example, may be used.

If the three-dimensional object data generation apparatus 10 instructs the control unit 112 to form a three-dimensional object having a test pattern, the control unit 112 controls the discharge head driving unit 104 and the like such that the three-dimensional object having the test pattern is formed. The control unit 112 then causes the strength sensor 114 to measure the strength of the formed three-dimensional object having the test pattern and transmits results of the measurement to the three-dimensional object data generation apparatus 10.

Figure 5:
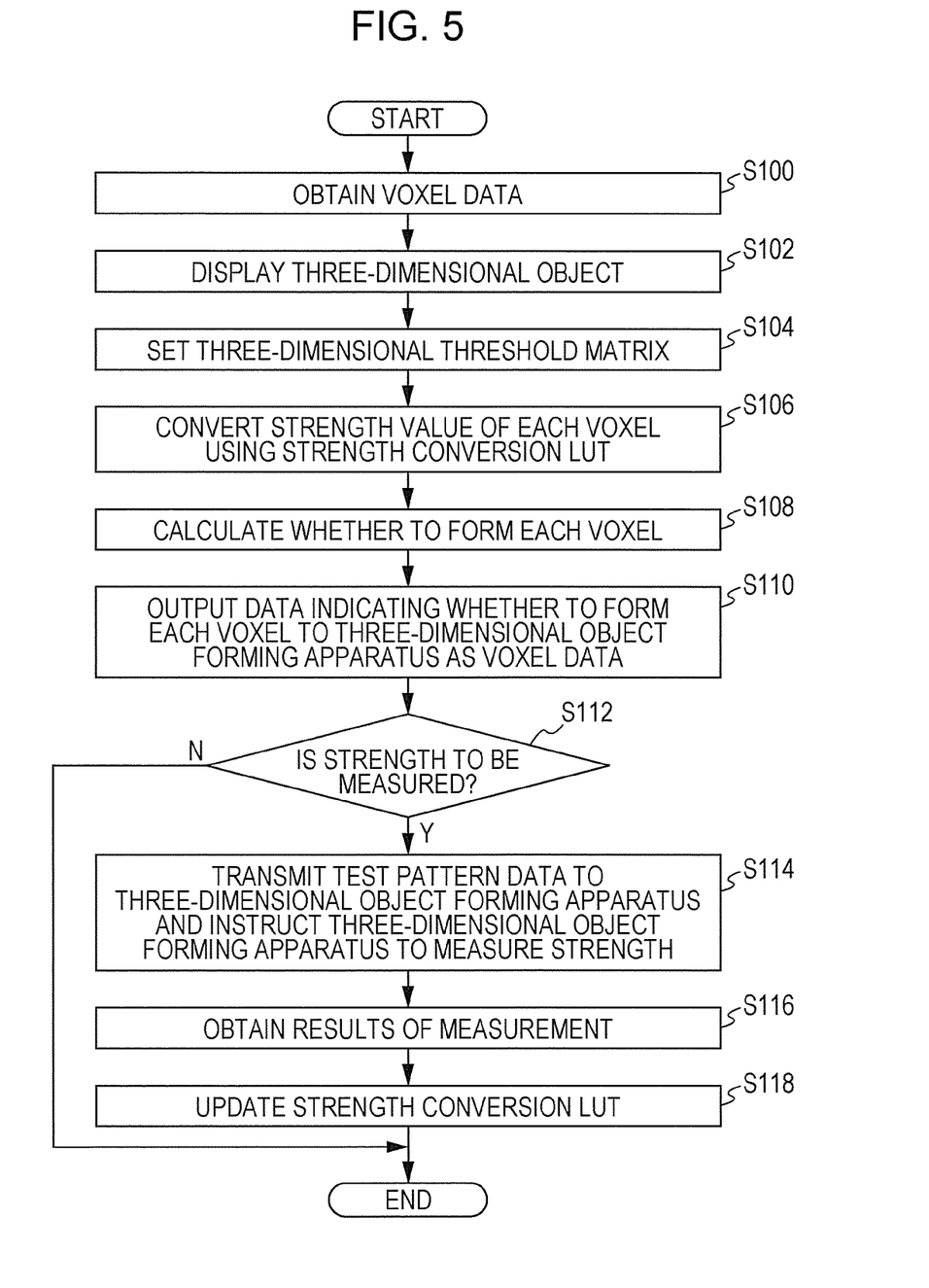
FIG. 5 is a flowchart illustrating a process achieved by a program for generating three-dimensional object data.

Next, the operation of the three-dimensional object data generation apparatus 10 according to the present exemplary embodiment will be described with reference to FIG. 5. A generation process illustrated in FIG. 5 is performed by causing the CPU 12A to execute a program for generating three-dimensional object data. The generation process illustrated in FIG. 5 is performed, for example, when the user has requested execution of the program. In the present exemplary embodiment, description of a process for generating support material data is omitted.

In step S100, voxel data corresponding to a three-dimensional object to be formed is read, for example, from the storage unit 20. Alternatively, voxel data may be obtained from an external apparatus using the communication unit 18.

In step S102, three-dimensional object display data is generated from the voxel data obtained in step S100 and displayed on the display unit 16.

In step S104, a three-dimensional threshold matrix used to calculate whether to form each voxel is set. In the three-dimensional threshold matrix, thresholds are arranged in a three-dimensional space in accordance with a predetermined basic shape.

Figure 6:
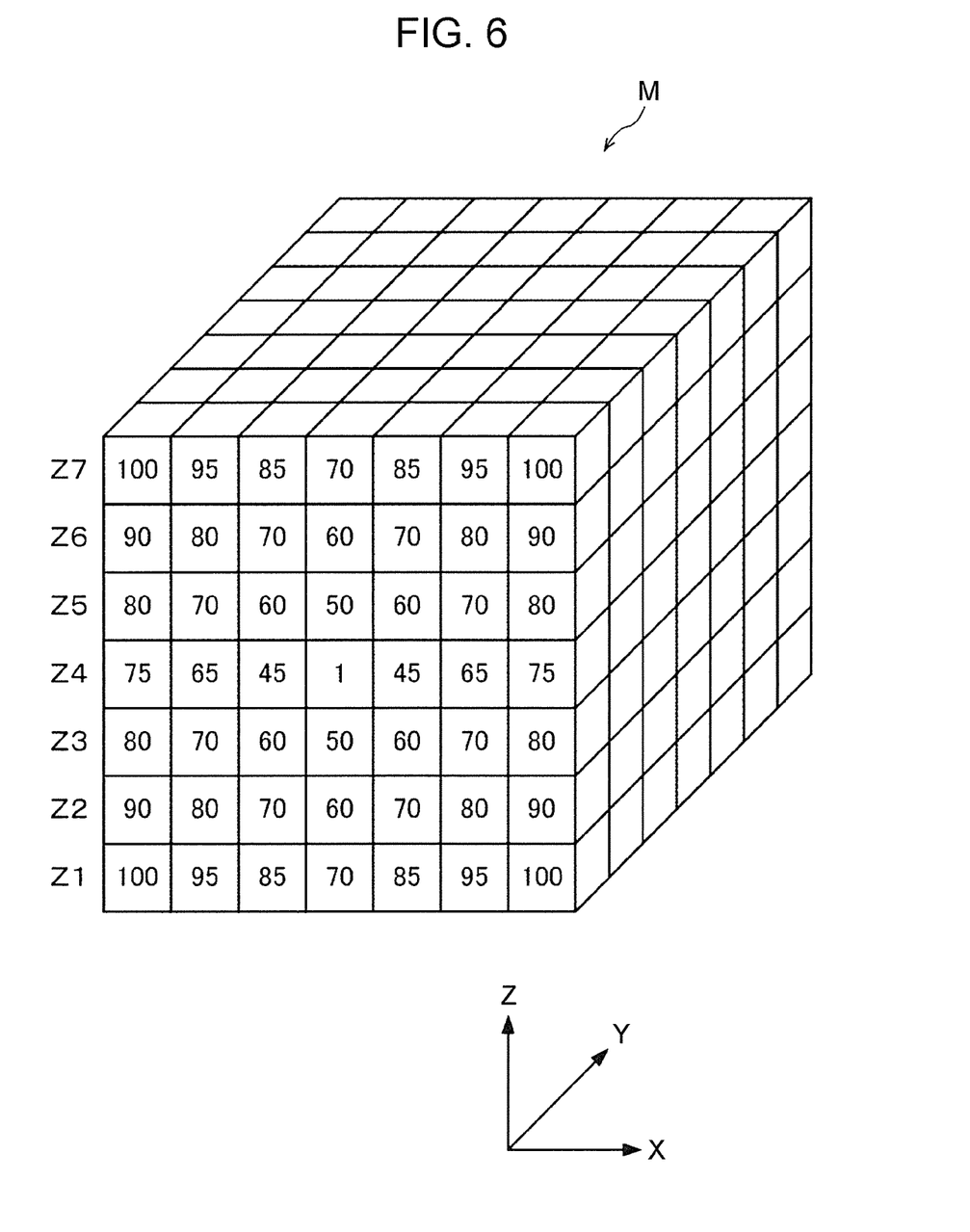
FIG. 6 is a diagram illustrating an example of a three-dimensional threshold matrix.

FIG. 6 illustrates a three-dimensional threshold matrix M as an example. As illustrated in FIG. 6, the three-dimensional threshold matrix M includes seven layers of threshold tables Z1 to Z7.

Figure 7:
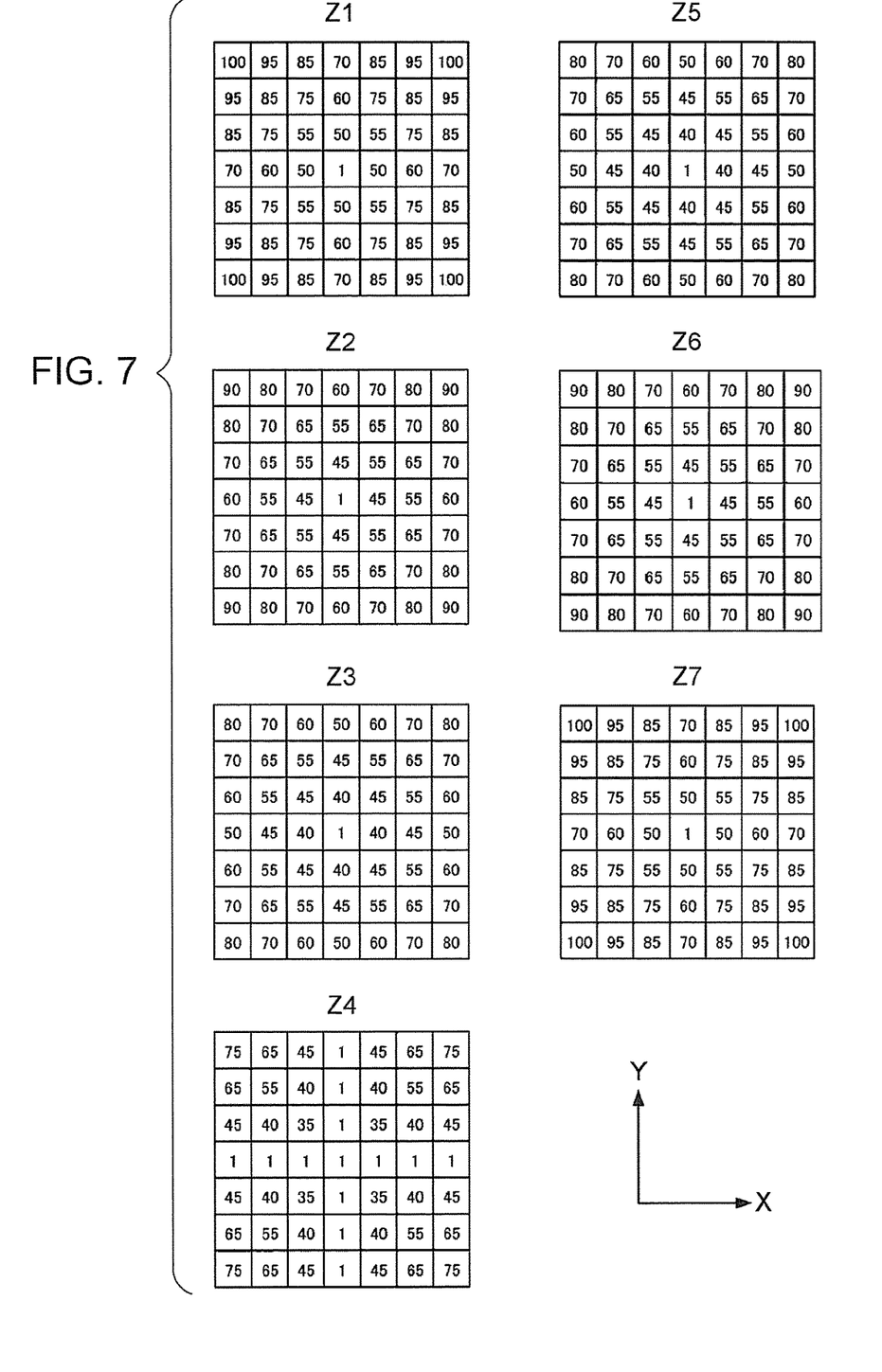
FIG. 7 is a diagram illustrating an example of threshold tables included in the three-dimensional threshold matrix.
Figure 8:
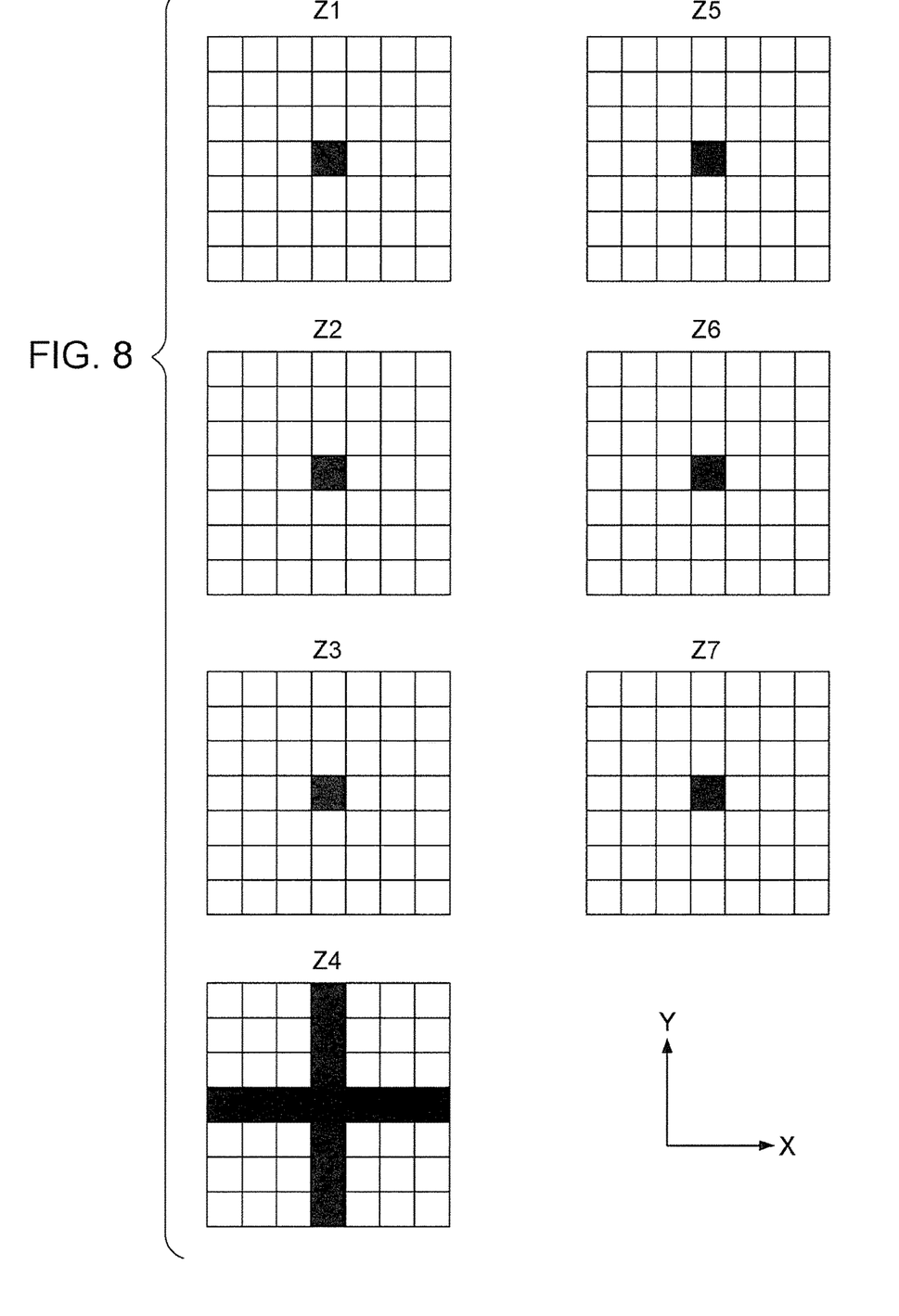
FIG. 8 is a diagram illustrating presence or absence of discharging of a forming material.

FIG. 7 illustrates an example of the threshold tables Z1 to Z7. As described later, when whether to form each voxel is calculated, halftone is performed on voxel data in layers corresponding to the threshold tables Z1 to Z7 with the threshold tables Z1 to Z7 set as dither matrices. That is, each threshold in the threshold tables Z1 to Z7 and a strength value of a corresponding voxel are compared with each other. If the strength value is equal to or larger than the threshold, the voxel is to be formed, and if the strength value is smaller than the threshold, the voxel is not to be formed. It is assumed in the present exemplary embodiment that a value that can be taken by a strength value is equal to or larger than 1. If the threshold is 1, a voxel corresponding to the threshold will be invariably formed. Parts where thresholds are 1, therefore, correspond to the basic shape.

Figure 10:
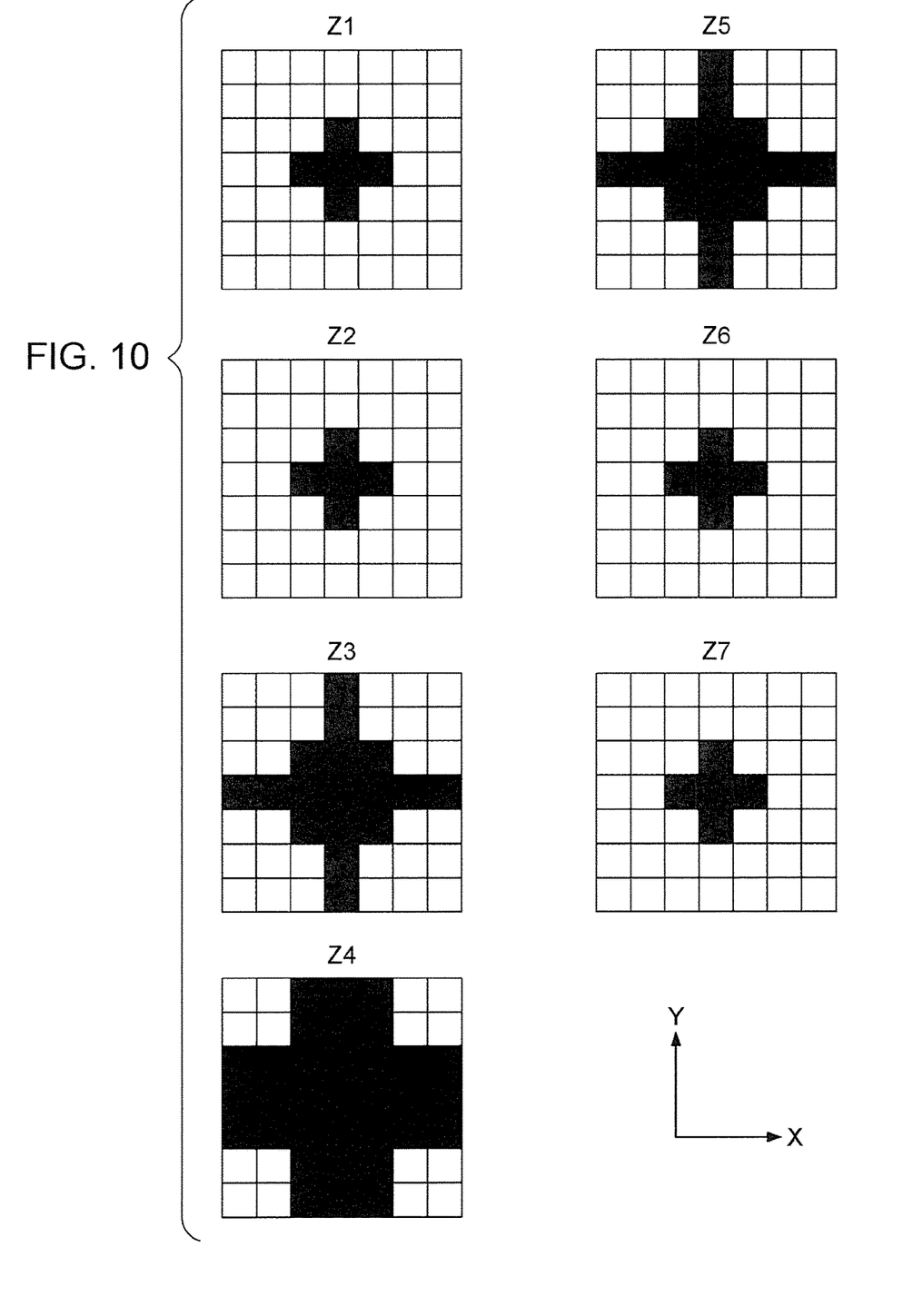
FIG. 10 is a diagram illustrating presence or absence of discharging of a forming material.

In the example illustrated in FIG. 7, a threshold of 1 is set at the center of every layer, and in the fourth threshold table Z4, which is a central layer in a Z-axis direction, a threshold of 1 is set on an XY plane in a shape of a cross. That is, thresholds at positions corresponding to the basic shape are set to a minimum value of a possible range of thresholds. If strength values of voxels are all 1 in the three-dimensional threshold matrix M, therefore, a forming material is discharged at positions indicated by solid squares in FIG. 10. As a result, the basic shape of the three-dimensional threshold matrix M becomes a basic shape K illustrated in FIG. 11.

Figure 9:
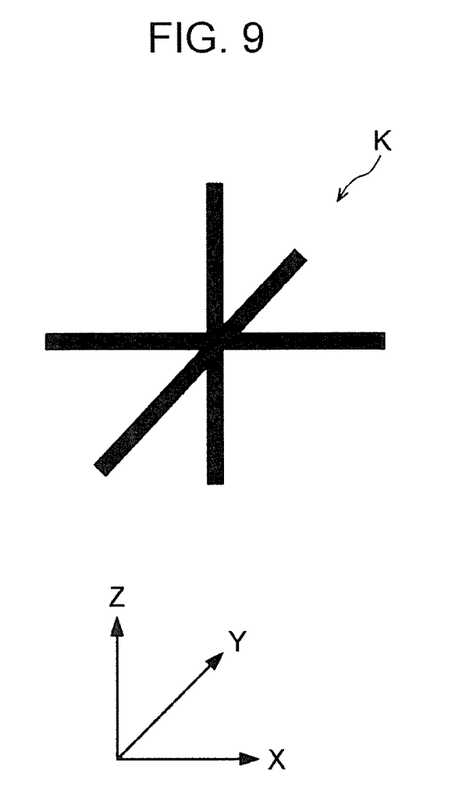
FIG. 9 is a diagram illustrating an example of a basic shape.
Figure 11:
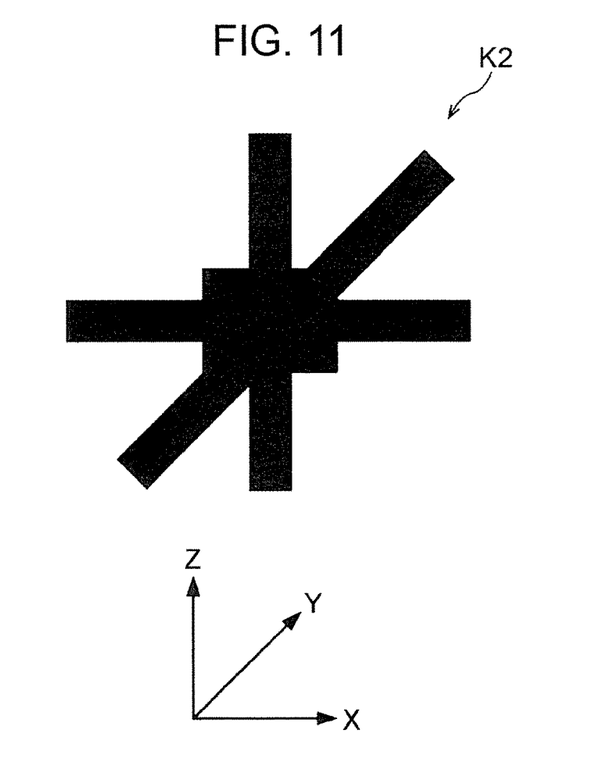
FIG. 11 is a diagram illustrating another example of the basic shape.

As illustrated in FIG. 7, thresholds in the threshold tables Z1 to Z7 other than those at the positions corresponding to the basic shape are all 35 or larger. If the strength values of the voxels are all smaller than 35, therefore, the basic shape K illustrated in FIG. 9 is obtained. If the strength values of the voxels are all 50, on the other hand, a forming material is discharged at positions indicated by solid squares in FIG. 10. As a result, as illustrated in FIG. 11, the basis shape of the three-dimensional threshold matrix M becomes a basic shape K2, which is thicker than the basic shape K illustrated in FIG. 9.

As illustrated in FIG. 7, the thresholds set in the threshold tables Z1 to Z7 other than those at the positions corresponding to the basic shape are larger in the periphery. This means that the thresholds set in the three-dimensional threshold matrix M are smaller at the center of the three-dimensional space indicated by the three-dimensional threshold matrix M and larger in the periphery. That is, because of the thresholds set in the three-dimensional threshold matrix M, the percentage of voxels to be formed is lower in the periphery of the three-dimensional space indicated by the three-dimensional threshold matrix M. In other words, the thresholds are set such that strength becomes higher at the center of the three-dimensional space indicated by the three-dimensional threshold matrix M. As the three-dimensional threshold matrix M becomes smaller, the basic shape becomes smaller and a resultant three-dimensional object becomes denser and harder. As the three-dimensional threshold matrix M becomes larger, on the other hand, the basic shape becomes larger and a resultant three-dimensional object becomes thinner and softer. If the user desires to make a certain part hard, therefore, the user may set a small three-dimensional threshold matrix, and if the user desires to make a certain part soft, the user may set a large three-dimensional threshold matrix.

In the present exemplary embodiment, the storage unit 20 stores various three-dimensional threshold matrices corresponding to various basic shapes. The user operates the storage unit 14 to select a desired basic shape, that is, a desired three-dimensional threshold matrix. The number of three-dimensional threshold matrices to be selected need not be one, and a plurality of three-dimensional threshold matrices may be selected for each part of a three-dimensional object, instead.

In step S106, the strength conversion LUT is read from the storage unit 20, and strength values of the voxel data obtained in step S100 are converted using the read strength conversion LUT such that the three-dimensional object achieves a target level of strength.

Figure 12:
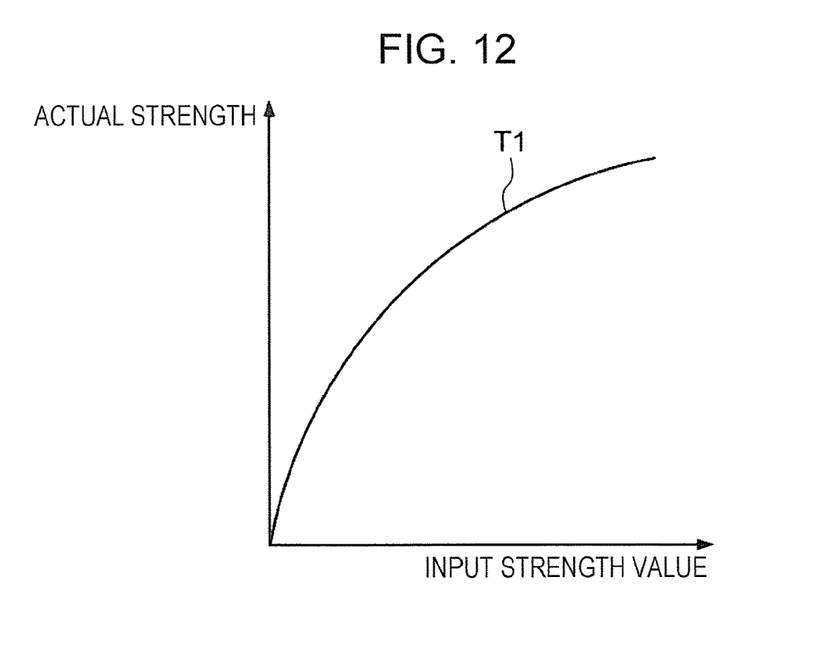
FIG. 12 is a diagram illustrating an example of a relationship between an input strength value and actual strength.
Figure 13:
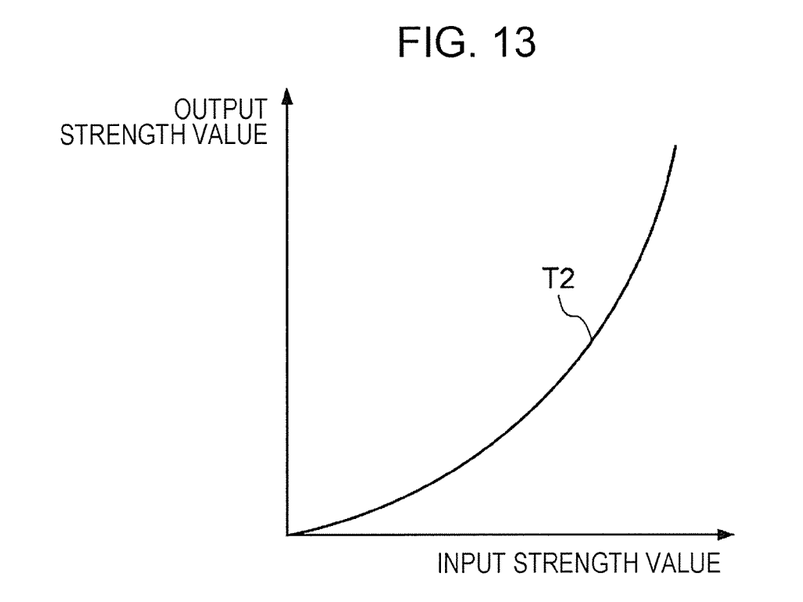
FIG. 13 is a diagram illustrating an example of a conversion characteristic of a strength conversion lookup table (LUT)

Ideally a relationship between the strength value of each voxel input to the three-dimensional object forming apparatus 100 and actual strength has a linear characteristic, but in practice, a nonlinear characteristic T1 illustrated in FIG. 12 might be obtained. The strength conversion LUT is therefore used to convert strength values such that the relationship between the strength value of each voxel input to the three-dimensional object forming apparatus 100 and actual strength has a linear characteristic. When the relationship between the strength value of each voxel input to the three-dimensional object forming apparatus 100 and actual strength has the characteristic T1 illustrated in FIG. 12, for example, the strength conversion LUT may exhibit a conversion characteristic T2 illustrated in FIG. 13. That is, the conversion characteristic T2 may be a reverse characteristic of the characteristic T1. As a result, a relationship between strength values after the conversion and actual strength has a linear characteristic.

In step S108, whether to form each voxel is calculated on the basis of the strength value set for the voxel indicated by the voxel data and the three-dimensional threshold matrix set in step S104. More specifically, as described above, halftone is performed on voxel data in layers of the threshold tables Z1 to Z7 with the threshold tables Z1 to Z7 set as dither matrices. That is, each threshold on the threshold tables Z1 to Z7 and a strength value of a voxel at a position corresponding to the threshold are compared with each other, and if the strength value is equal to or larger than the threshold, the voxel is to be formed. If the strength value is smaller than the threshold, the voxel is not to be formed.

In step S110, data indicating whether to form each voxel calculated in step S108 is transmitted to the three-dimensional object forming apparatus 100 as voxel data.

The obtaining unit 110 of the three-dimensional object forming apparatus 100 obtains the voxel data transmitted from the three-dimensional object data generation apparatus 10. The control unit 112 drives the discharge head driving unit 104 to move the discharge head 102 in two dimensions and control discharging of a forming material by the discharge head 102 such that the forming material is discharged in accordance with the voxel data obtained by the obtaining unit 110. As a result, a three-dimensional object is formed.

In step S112, whether it is time to measure the strength of the three-dimensional object having the test pattern is determined. The strength may be measured before an image is formed or at predetermined time intervals, but is not limited to these.

If a result of step S112 is positive, the process proceeds to step S114. If the result of step S112 is negative, the routine ends.

In step S114, test pattern data, which is voxel data regarding the three-dimensional object having the test pattern, is read from the storage unit 20 and transmitted to the three-dimensional object forming apparatus 100. An instruction to form the three-dimensional object having the test pattern and measure the strength of the formed three-dimensional object having the test pattern is then given. The three-dimensional object having the test pattern may have a shape with which strength can be easily measured. For example, the three-dimensional object having the test pattern may be a rectangular parallelepiped whose strength increases stepwise from one end to another end at certain intervals. In this case, the rectangular parallelepiped may be divided into a plurality of voxels, and strength values may be set for the voxels such that the strength values increase from the one end to the other end of the rectangular parallelepiped. If a possible range of strength values is 1 to 100, for example, the strength values may be incremented by 10, namely 10, 20, . . . , and 100. The strength values may be set differently insofar as actual strength characteristics can be identified.

The three-dimensional object forming apparatus 100 thus forms the three-dimensional object having the test pattern and measures the strength of the formed three-dimensional object using the strength sensor 114. As described above, when the three-dimensional object having the test pattern is a rectangular parallelepiped, the strength sensor 114 sequentially measures the strength of the rectangular parallelepiped from one end to another end at certain intervals. The three-dimensional object forming apparatus 100 then transmits results of the measurement of strength to the three-dimensional object data generation apparatus 10. Alternatively, the three-dimensional object having the test pattern may be formed in a different part of the stand 106 at the same time as the three-dimensional object to be formed is formed.

In step S116, the results of the measurement are obtained from the three-dimensional object forming apparatus 100.

In step S118, the strength conversion LUT is updated using the results of the measurement of strength obtained in step S116. More specifically, the strength conversion LUT is updated using the results of the measurement of strength obtained in step S116 such that the relationship between the strength value of each voxel and actual strength has a linear characteristic. When the relationship between the strength value of each voxel of the three-dimensional object having the test pattern and actual strength has the characteristic T1 illustrated in FIG. 12, for example, the strength conversion LUT may exhibit a conversion characteristic T2 illustrated in FIG. 13. That is, the conversion characteristic of the strength conversion LUT may be a reverse characteristic of the characteristic T1. As a result, a relationship between strength values after the conversion and actual strength has a linear characteristic.

Although the present disclosure has been described using an exemplary embodiment, the present disclosure is not limited to the above exemplary embodiment. The exemplary embodiment may be modified or improved in various ways without deviating from the scope of the present disclosure. The technical scope of the present disclosure also includes such modifications and improvements.

Figure 14:
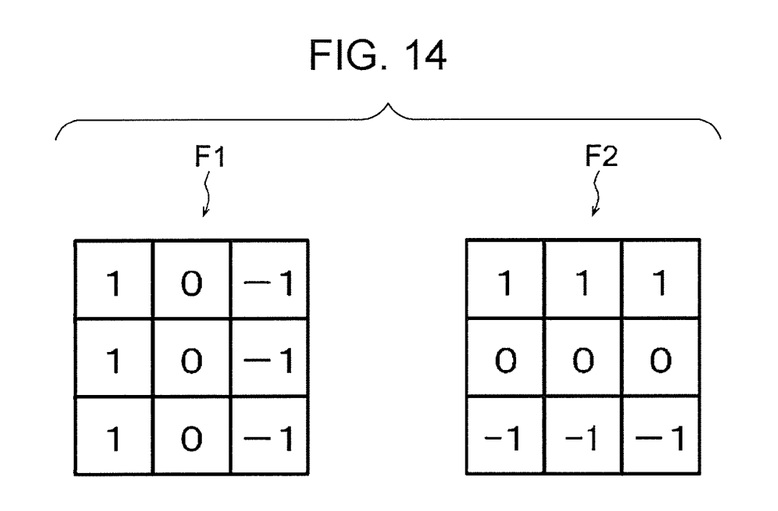
FIG. 14 is a diagram illustrating an example of edge extraction filters.

For example, edges of a three-dimensional object may be extracted using edge extraction filters F1 and F2 that extract vertical and horizontal edges, respectively, illustrated in FIG. 14 for the voxel data obtained in step S100. In this case, for example, a first three-dimensional threshold matrix corresponding to a predetermined first strength may be set for first voxels corresponding to a part other than the edges extracted by the edge extraction filters F1 and F2, and a second three-dimensional threshold matrix corresponding to a predetermined second strength, which is higher than the first strength, may be used for second voxels corresponding to the edges extracted by the edge extraction filters F1 and F2 in step S104.

In step S108, whether to form each of the voxels corresponding to the part other than the edges is calculated using the first three-dimensional threshold matrix, and whether to form each of the voxels corresponding to the edges is calculated using the second three-dimensional threshold matrix.

As a result, strength can be flexibly adjusted, that is, for example, the edges of the three-dimensional object can be hardened and the part other than the edges including the inside of the three-dimensional object can be softened.

Although the edge extraction filters F1 and F2 illustrated in FIG. 14 are so-called "Prewitt operators", another type of edge extraction filter such as a Sobel operator may be used, instead.

Different three-dimensional threshold matrices may be used not for edges and a part other than the edges but for any parts.

Although the strength value of each voxel is converted using the strength conversion LUT in step S106 illustrated in FIG. 5 in the present exemplary embodiment, step S106 may be omitted if the relationship between the strength value of each voxel and actual strength has a linear characteristic.

If a desired level of strength is not achieved even after the strength conversion LUT is updated in step S118 illustrated in FIG. 5, the user may make settings to directly update the strength conversion LUT.

In addition, a plurality of forming materials having different elasticity coefficients may be prepared, and a three-dimensional object may be formed using different forming materials in accordance with different strength values. For example, the inside of a three-dimensional object may be formed by a forming material having a low elasticity coefficient, and a surface of the three-dimensional object may be formed by a forming material having a higher elasticity coefficient.

In addition, although the physical property is strength in the present exemplary embodiment, another physical property may be employed, instead. For example, the physical property employed may be density, thermal conductivity, specific heat, thermal expansion coefficient, electrical resistivity, permittivity, piezoelectric coefficient, permeability, refractive index, birefringence, rotatory coefficient, optical absorption coefficient, or acoustic impedance.

Although the strength sensor 114 measures the strength of a three-dimensional object having a test pattern in the present exemplary embodiment, not strength but a physical quantity correlated with strength may be measured, instead. For example, electrical conductivity may be measured using an unsteady hot wire method. Alternatively, electric resistance may be measured using an eddy current method. Alternatively, colors may be measured using a spectrophotometric colorimeter.

Although the three-dimensional object data generation apparatus 10 and the three-dimensional object forming apparatus 100 that forms a three-dimensional object on the basis of three-dimensional object data are separately provided in the above exemplary embodiment, the three-dimensional object forming apparatus 100 may have the function of the three-dimensional object data generation apparatus 10, instead.

That is, the obtaining unit 110 of the three-dimensional object forming apparatus 100 may obtain voxel data, and the control unit 112 may generate three-dimensional object data by performing the generation process illustrated in FIG. 5.

Alternatively, for example, the process for generating three-dimensional object data illustrated in FIG. 5 may be achieved by hardware such as an application-specific integrated circuit (ASIC). In this case, processing speed increases compared to when the process is achieved by software.

Although the program for generating three-dimensional object data is installed on the storage unit 20 in the above exemplary embodiment, the process need not be installed on the storage unit 20. The program according to the above exemplary embodiment may be provided in a computer readable medium, instead. For example, the program in the present disclosure may be provided in an optical disc such as a compact disc read-only memory (CD-ROM) or a digital versatile disc read-only memory (DVD-ROM) or a semiconductor memory such as a universal serial bus (USB) memory or a memory card. Alternatively, the program according to the above exemplary embodiment may be obtained from an external apparatus through a communication line connected to the communication unit 18.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A three-dimensional object data generation apparatus comprising:
   a processor configured to:
   obtain three-dimensional object data representing a three-dimensional object with a plurality of voxels, for each of which a physical property value is set;
   set a three-dimensional threshold matrix in which thresholds are arranged in a three-dimensional space in accordance with a predetermined basic shape;
   calculate whether to form each of the plurality of voxels on a basis of the physical property value of the voxel and the three-dimensional threshold matrix; and
   extract an edge of the three-dimensional object,
   wherein the processor is further configured to set a first three-dimensional threshold matrix corresponding to a first physical property for a first voxel corresponding to a part other than the edge and a second three-dimensional threshold matrix corresponding to a second physical property, which is higher than the first physical property, for a second voxel corresponding to the edge.

2. The three-dimensional object data generation apparatus according to claim 1,
   wherein the thresholds at positions corresponding to the basic shape are set to a minimum possible value.

3. The three-dimensional object data generation apparatus according to claim 2,
   wherein the thresholds at positions other than the positions corresponding to the basic shape are set such that the thresholds increase toward a periphery of the three-dimensional space from a center of the three-dimensional space.

4. The three-dimensional object data generation apparatus according to claim 3,
   wherein the processor is further configured to convert the physical property value of each of the plurality of voxels into a physical property value with which the three-dimensional object achieves a target physical property.

5. The three-dimensional object data generation apparatus according to claim 2,
   wherein the processor is further configured to convert the physical property value of each of the plurality of voxels into a physical property value with which the three-dimensional object achieves a target physical property.

6. The three-dimensional object data generation apparatus according to claim 1,
   wherein the thresholds at positions other than the positions corresponding to the basic shape are set such that the thresholds increase toward a periphery of the three-dimensional space from a center of the three-dimensional space.

7. The three-dimensional object data generation apparatus according to claim 6,
   wherein the processor is further configured to convert the physical property value of each of the plurality of voxels into a physical property value with which the three-dimensional object achieves a target physical property.

8. The three-dimensional object data generation apparatus according to claim 1,
   wherein the processor is further configured to convert the physical property value of each of the plurality of voxels into a physical property value with which the three-dimensional object achieves a target physical property.

9. The three-dimensional object data generation apparatus according to claim 8,
   wherein the processor is further configured to convert the physical property value of each of the plurality of voxels into the physical property value with which the three-dimensional object achieves the target physical property using a conversion table and to update the conversion table using a physical property value measured from the three-dimensional object formed on a basis of the three-dimensional object data.

10. A three-dimensional object forming apparatus comprising:
   the three-dimensional object data generation apparatus according to claim 1; and
   a forming unit comprising a controller configured to form the three-dimensional object on a basis of the three-dimensional object data generated by the three-dimensional object data generation apparatus.

11. A non-transitory computer readable medium storing a program for generating three-dimensional object data, the program causing a computer to execute a process, the process comprising:
   obtaining three-dimensional object data representing a three-dimensional object with a plurality of voxels, for each of which a physical property value is set;
   setting a three-dimensional threshold matrix in which thresholds are arranged in a three-dimensional space in accordance with a predetermined basic shape;
   calculating whether to form each of the plurality of voxels on a basis of the physical property value of the voxel and the three-dimensional threshold matrix;
   extracting an edge of the three-dimensional object; and
   setting a first three-dimensional threshold matrix corresponding to a first physical property for a first voxel corresponding to a part other than the edge and a second three-dimensional threshold matrix corresponding to a second physical property, which is higher than the first physical property, for a second voxel corresponding to the edge.

* * * * *